United States Patent [19]
Dornow

[11] Patent Number: 4,710,389
[45] Date of Patent: Dec. 1, 1987

[54] METHOD AND APPARATUS FOR CONTROLLING PEELING MACHINES FOR PEELING FRUIT OR VEGETABLES

[76] Inventor: Karl-Dietrich Dornow, Kaiser-Friedrich-Ring 96, 4000 Düsseldorf, Fed. Rep. of Germany

[21] Appl. No.: 821,056

[22] Filed: Jan. 21, 1986

[30] Foreign Application Priority Data

Jan. 29, 1985 [DE]  Fed. Rep. of Germany ....... 3502845

[51] Int. Cl.[4] .......................... G01N 33/02; A23N 7/02
[52] U.S. Cl. ...................................... 426/231; 99/487; 99/536; 99/623; 426/483
[58] Field of Search .................. 426/231, 483; 99/486, 99/487, 516, 536, 623, 624, 626; 134/113

[56] References Cited

U.S. PATENT DOCUMENTS

| | | | |
|---|---|---|---|
| 4,237,782 | 12/1980 | Bichel | 99/626 |
| 4,307,741 | 12/1981 | Rossi | 134/113 |
| 4,394,398 | 7/1983 | Wilson | 426/483 |

*Primary Examiner*—George Yeung
*Attorney, Agent, or Firm*—Toren, McGeady & Associates

[57] ABSTRACT

In a peeling machine for peeling fruit or vegetables, for example a continuously operating roller peeling machine which comprises motor-driven peeling rollers and a device, driven independently of the peeling rollers, for metered conveyance of the fruit or vegetables to be peeled, through the machine, the quality of the peeled fruit or vegetables and the peeling performance are decisively influenced by controlling the speeds of the conveying device and of the peeling rollers and also controlling the input rate of fruit or vegetables to be peeled. In order to make the control not solely dependent upon the judgement of the operator of the machine, the magnitude of the input quantity of the fruit or vegetables and of water supplied to the machine and also of the water containing peelings discharged from the machine are measured. From the difference of these variables the ratio of the weight of waste peelings to the weight of fruit or vegetables supplied to the machine is calculated and the machine is controlled to keep this ratio at a predetermined value.

13 Claims, 2 Drawing Figures

METHOD AND APPARATUS FOR CONTROLLING PEELING MACHINES FOR PEELING FRUIT OR VEGETABLES

This invention relates to a method of controlling peeling machines or apparatus for peeling fruit or vegetables for example potatoes, tubers and root vegetables which operate with cutting or cleaning liquid, for example cup-type peeling machines such as carborundum or knife peeling machines and in particular roller peeling machines, comprising at least one motor-driven peeling roller or peeling plate and usually also devices for the metered conveyance of the produce to be peeled in the peeling machine.

BACKGROUND OF THE INVENTION

Such a peeling machine comprising two or more peeling rollers is disclosed in German Specification No. 2 547 863. In this Patent Specification, the peeling rollers are driven in opposite directions and their external surfaces have a rough facing, for example of abrasive powder or carborundum. For continuous operation of the peeling machine, the produce to be peeled is fed in at one end of the peeling rollers by means of a chute and the produce already situated on the peeling rollers is pushed by the incoming vegetables or fruit towards the other end and is there collected in a collecting vessel. During the conveying, the peel of the produce to be peeled is rubbed off by the rotary movement of the peeling rollers having roughened surfaces. To promote the conveyance of the produce from one end of the peeling rollers to the other, the surfaces of the peeling rollers are provided with rib-like projections, which are distributed along a helical line over the surface of the peeling rollers. For conveying the material to be peeled, it is also known (see a prospectus entitled "The new roller peeling machine for potatoes, tubers and root vegetables" by the Inventor) to provide in the roller peeling machine at least one conveying screw which can be driven independently of the peeling rollers. In the peeling operation, fresh water is continually supplied from above to the roller peeling machine by a pipe. The fresh water immediately washes away the waste and leaves the machine as waste water, which should be understood to mean fresh water containing peel waste.

In roller peeling machines in operation, the speed of the peeling rollers and of the conveying devices, for example a conveying screw, can be regulated. The most favourable setting of the speeds together with the input rate of the produce, which constitute the most important criteria governing the quantity of the peel waste and the peeling performance, is achieved by visual assessment by operating personnel. The operator judges the peeled produce leaving the machine according to visual impressions; the speed of the rollers and of the conveying screw are then regulated according to the operator's discretion. The input rate of the produce is also adjusted solely by the operator's judgement. This control, based upon feel and subjective impressions, results in that the amount of waste material that is produced by a peeling machine is almost always considerably higher than is desired and necessary. Furthermore, the inadequate adjustment of the operating variables of the peeling machine has the effect that, assuming a constant peeling result, the output of peeled produce per hour of the peeling machine is unnecessarily reduced. The same considerations apply also for the known, intermittently operating machines, such as carborundum and knife peeling machines. One or more peeling discs, provided with knives or faced with carborundum, are disposed in the machine, or peeling cones equipped in a similar manner project laterally into the machine. Here again, visual assessment of the produce to be peeled, fed in intermittently for example in batches of 20 kg each time, is all that is provided.

OBJECT OF THE INVENTION

The object of the present invention is to avoid the aforementioned disadvantages in the operation of apparatus for peeling fruit or vegetables and to make possible a method of operation of the apparatus such that the desired good peeling result is achieved in conjunction with a high throughput rate of the fruit or vegetables and a minimum production of peel waste.

SUMMARY OF THE INVENTION

To this end, the present invention consists in a method of controlling a peeling machine for peeling fruit or vegetables which operates with cutting or cleaning liquid and which comprises at least one motor-driven peeling roller or peeling plate and optionally devices for the metered conveyance of the produce to be peeled in the peeling machine, wherein the operation of the peeling machine is determined in dependence upon a directly or indirectly ascertained variable of peel waste and/or from the appearance of peeled produce issuing from the machine.

The invention also consists in apparatus for peeling fruit or vegetables comprising at least one motor-driven peeling roller or peeling plate and optionally devices for the metered conveyance of the produce to be peeled in the peeling machine, wherein means are provided for measuring the quantity of fruit or vegetables fed to the machine and/or the quantity of water fed to the machine and/or the quantity of waste water and peelings discharged from the machine and/or the quantity of peeled fruit or vegetables discharged from the machine.

According to one feature of the invention, ascertainment and signalling of the magnitude of the quantity of produce to be peeled instantaneously fed into the peeling machine and/or of the magnitude of the average quantity determined during a specific unit time, for example per hour, and ascertainment of the quantity of cutting or cleaning water supplied to the machine, also of the quantity of waste water leaving the machine is provided; these quantities are calculated in relation to one another and their difference indicates the quantity of peel waste leaving the machine. This difference serves as a starting variable for a computer calculation, by which the instantaneous percentage of waste is continually ascertained from the ratio of the difference value to the relevant input rate of produce to be peeled and is displayed, and the peeling machine is controlled to bring the percentage to the desired value and to maintain this value until the end of the peeling operation.

The method in accordance with the invention furthermore provides that the peeling operation be adjusted as a function of the indicated percentage of waste in order to achieve the minimum waste by modifying the principal operating variables that can be influenced by the operator of the peeling machine, such as input quantity, conveying and peeling roller speeds. The thus established percentage of waste can be read off at any time from a control panel by the operator and the controllable variables of the machine can be varied from the control panel, so that an optimum operating result can be adjusted and maintained. The ascertainment of the actual percentage of waste and the optimisation and maintaining of the most favourable value of this percentage can be achieved by computer control and fully automatically. For example, starting from a fixed produce input rate in a roller peeling machine having a conveyor screw, first the roller speed and thereafter the conveyor screw speed can be optimised and thereafter the roller speed can again be adjusted, because this speed may possibly have led to an unfavourable value of the waste percentage due to the changing of the conveyor screw speed. Continual mutual balancing of the operating variables should preferably be effected.

In the case of intermittently operating batch cup-type peeling machines, such as carborundum and knife peeling machines, the speed of the peeling tools and/or the duration of the batch peeling time exert a great influence upon the quality of the peeled produce, which can therefore be correspondingly modified. This presupposes a control for the drive of the machine, for example of a peeling plate. Depending upon whether the control is set in dependence upon the difference between a previously accurately weighted input quantity (the produce to be peeled can be fed into the machine manually or with a storage vessel coupled to a weighing machine) and the output quantity of the peeled produce, or the difference between fresh water input and waste water output, optimisation of the peeling plate speed and/or of the duration of the peeling time leads to the desired result.

In one embodiment of the method in accordance with this invention, a value for the instantaneous percentage of peeled waste is calculated from the difference in weight between the input of material to be peeled and the peeled material output. According to one proposal of the invention, the method of this invention may advantageously be carried out with an apparatus which provides, at the input and output of the peeling machine, a measuring device, such as a band weighing machine, for establishing the input and output quantities.

With advantage, a pivotal baffle plate connected in front of the inlet to the peeling machine may be used as a measuring device for establishing the input quantity of produce to be peeled. A value for the input quantity is then derived from the impact force of the produce fed to the machine against the baffle plate. For this purpose the measured value of the impact force is converted, by a measured value sensor connected directly to the baffle plate, into an angle through which the plate moves and is then converted by means of a core moving in a differential transformer. With this arrangement, on account of the space-saving form of construction of the baffle plate, an existing peeling machine may be equipped subsequently with an input measuring device, even where space conditions are restricted.

Alternatively, according to this invention, a value for the control can be obtained also by an indicator device for indicating the waste substances, that is the peelings, in the water discharged from the machine. A measuring device operating with ultrasonics, for example, is a suitable indicator device. For this purpose, the most constant possible water supply to the machine is necessary. Instead of a reading of volume or weight, the indication is whether more or less waste material is present in the waste water.

As a value for control purposes, according to a further proposal of this invention, a variable may be utilised which is generated by a computer after processing a measured signal which is supplied by an automatic viewing device as a function of peeling residues and/or eyes still remaining on the peeled product as an indicator value. In the peeling of potatoes, for example, depending upon the nature of intended further use of the peeled potatoes, different degrees of cleanliness may be necessary. Thus, for the production of chips, certain peel residues and a few eyes may still be permissible. Starting from a division of the degree of cleanliness in a scale from 0 to 100, the cleanliness may be assessed in the following scale:

0 to 5 = hardly any eyes or dark spots, that is well peeled;

40 to 50 = half-peeled, some peel still present.

Depending upon the computer print-out, the peeling machine can be automatically so adjusted that it produces the desired quality with the least possible waste. With a degree of cleanliness set at the scale value 30, adequately peeled potatoes can be obtained for the production of chips. In this connection, it is, furthermore, of great importance that the peeled material is no longer assessed by the human eye and that subjective impressions are thereby excluded.

BRIEF DESCRIPTION OF THE DRAWINGS

An example of a method and of apparatus in accordance with the invention will now be described with reference to the accompanying drawings in which.

DESCRIPTION OF THE PREFERRED EMBODIMENTS

Figure 1:
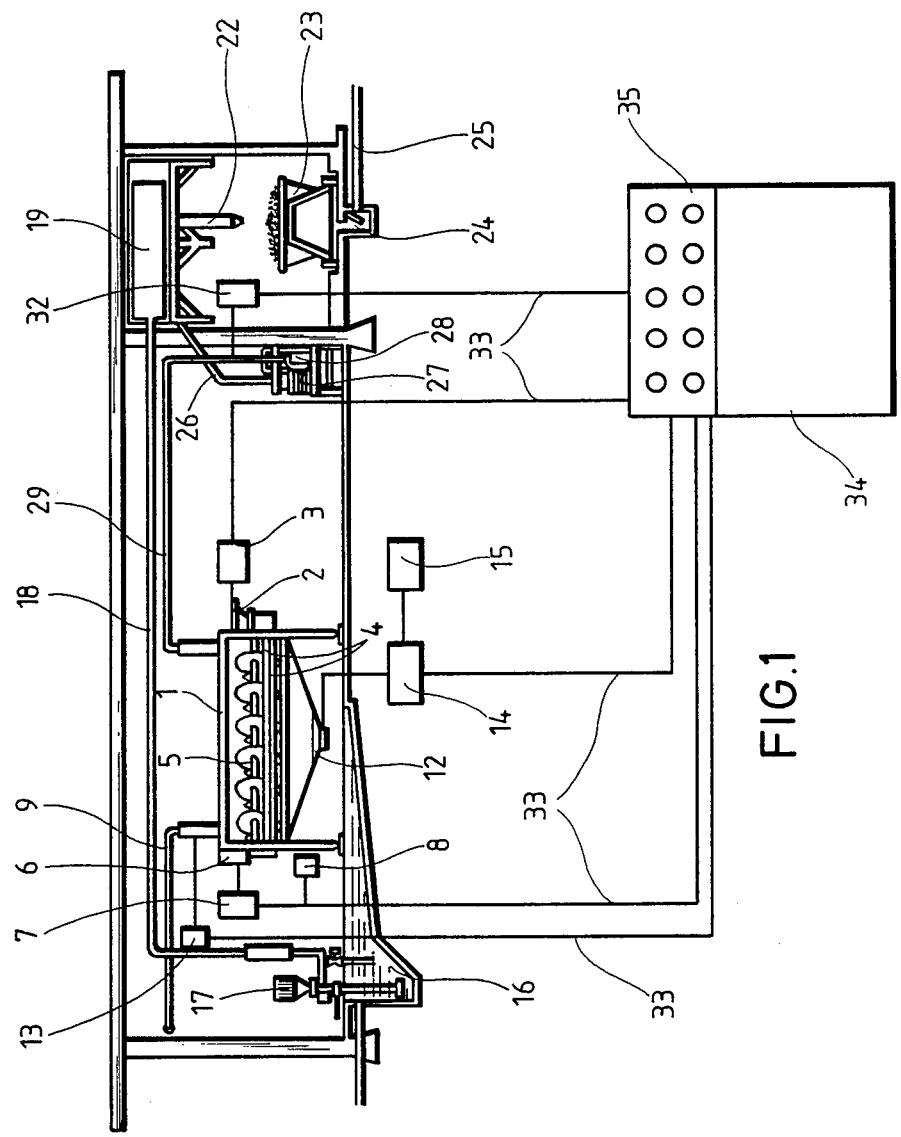
FIG. 1 is a diagrammatic overall view of a plant for treating produce to be peeled including an integrated roller peeling machine.

The method in accordance with the invention will be described in detail with reference to a roller peeling machine having a conveying screw. For reasons of simplification, measuring devices for the input and output quantities of the produce, such as fruit or vegetables, and the fresh and waste water quantities, and also indication and viewing devices for displaying the quality of peeled produce or the degree of waste water pollution respectively are illustrated only symbolically as a box. The produce to be peeled is supplied to the roller peeling machine 1 at an inlet 2, for example, by means of a conveyor belt, not shown, and is weighed by a band weighing machine or similarly suitable measuring device 3. For continuous operation, the peeling machine comprises motor-driven peeling rollers 4, and for the metered conveyance of the peeled material, a driven conveying screw 5. During conveyance, the peel of the produce peeled is rubbed off by roughened surfaces of the revolving peeling rollers. The peeled produce is removed from the roller peeling machine 1 at an outlet 6 and, for example, is weighed by a band weighing machine 7. For the optical assessment of the peeled produce, a viewing device 8 may also be provided at this point, by which a value for the appearance of the peeled produce can be established from the still present residues of peel and/or the presence of eyes.

During peeling, fresh water is continually supplied from above to the roller peeling machine 1 via a pipe 9. The fresh water washes the waste material away immediately and leaves the machine at a waste water outlet 12. Measuring devices 13 and 14 for ascertaining the quantity of fresh and waste water respectively are associated with the fresh water pipe 9 and the waste water outlet 12. At the waste water outlet 12, an indicator device 15, such as an ultrasonic device, may also be fitted, which indicates the content of waste material present in the waste water. So that the waste water may be used again, it is collected after leaving the roller peeling machine 1 in a waste water collecting pit 16, is stored and is conveyed by means of a pump 17 via a line 18 to a waste water separator 19 and is there largely cleansed of the waste material. The waste material passes via a chute 22 into a waste tank 23, which is located above a pit 24 having a channel 25 for dripping water. The water filtered in the waste water separator 19 passes, via a line 26, into a collecting tank 27 for filtered water and can be mixed with fresh water in the roller peeling machine 1 by means of a pump 28 via a line 29. In order that the quantity or rate of flow of filtered water supplied can be ascertained, a measuring device 32 for measuring the quantity of filtered water is fitted to the feed line 29. The measuring devices 3, 13, 14 and 32 and also the band weighing machine 7, the viewing device 8 and the indicator device 15, are connected via control lines 33 with a computer 34 having a control panel 35.

In operation, the measuring device 3 continually signals how much fruit or vegetables is instantaneously entering the peeling machine, or on average has entered the peeling machine, during a unit of time, for example per hour. This measured value is transmitted in the form of an electrical signal via the control lines 33 to the computer 34 and is displayed at a central control panel 35. On the control panel 35, indication is also provided via the measuring devices 13, 14, as to how much fresh water enters the peeling machine 1 and how much waste water leaves the machine. These readings are put into and stored in the computer 34 and also evaluated there, in that the computer calculates, from the difference between these two values compared with one another, the instantaneous peel waste and continually establishes the percentage of waste from the difference value related to the input quantity.

From the control panel 35, where the waste percentage or the indicator value input via the indicator device 15 at any time can be read off, an operator can modify the speeds of the peeling rollers 4 and of the conveying screw 5 and also the input quantity by push-button control, the adjusted characteristic data being read off on scales of the control panel 35. A reduction in the waste percentage or indicated value for an equivalent end product, wherein the indicated value is obtained by a viewing device 8 optically assessment the peeled material, may be obtained with an unchanged input quantity and unchanged speed of the conveying screw 5, solely by influencing the speeds of the peeling rollers 4. If the peeling rollers 4 rotate more slowly, the peeling process is less aggressive. On the other hand, care must be taken to ensure that the peeling rollers 4 do not revolve too slowly, because then, due to lack of turning-over of the produce, flat peeling and therefore more waste appears. Since the operator, however, can continually read off the waste percentages or indicator value, an appropriate correction can easily be carried out when changes occur.

A further possible way of reducing the waste percentage or indicated value consists in increasing the speed of the conveying screw 5, with a constant produce input rate and constant roller speed, so that the produce peeled is conveyed more rapidly through the peeling machine 1. If the waste percentage or indicator value are equal and the quality result satisfactory, then by increasing the speed of the screw and input rate, the roller speed remaining unchanged, an increased output per hour of the peeling machine can be achieved.

Figure 2:
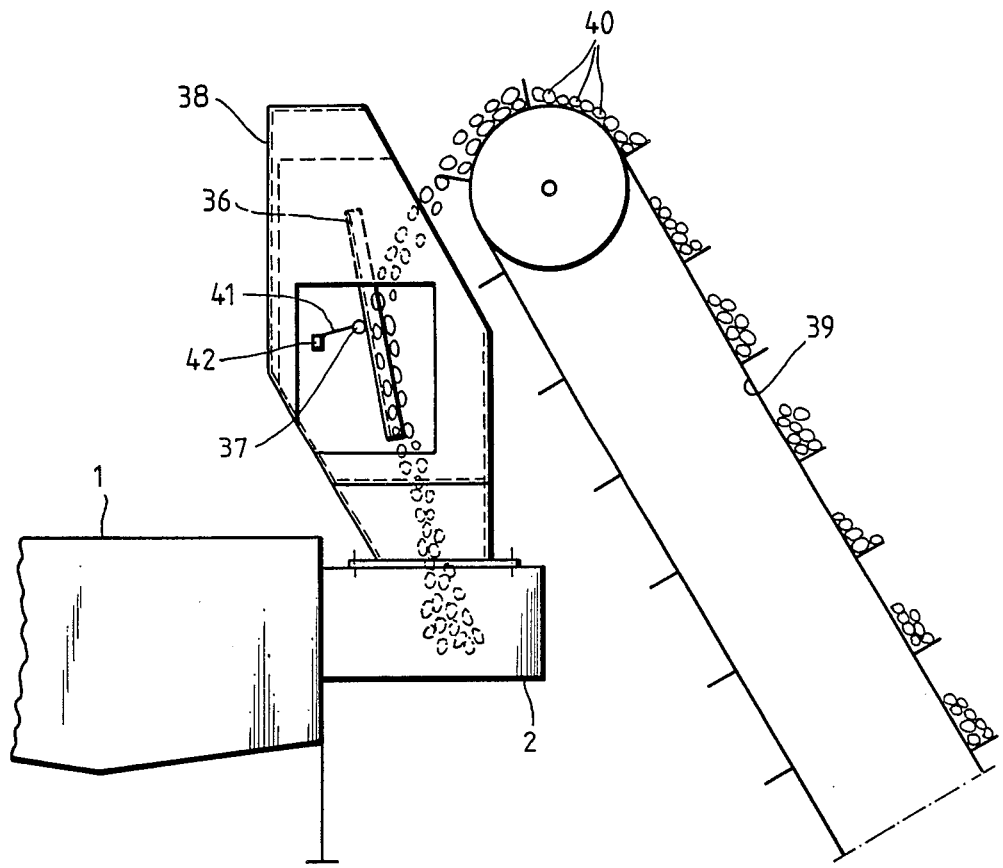
FIG. 2 is a diagrammatic elevation of part of the peeling apparatus comprising a baffle plate forming a measuring device for the produce to be peeled which is supplied via a conveyor belt.

A space-saving measuring device, suitable particularly for subsequent fitting to an existing machine, is illustrated in FIG. 2 and comprises a baffle plate 36, which is mounted pivotally about a pivot axis 37 in a housing 38 above the inlet 2 to the roller peeling machine 1. When produce to be peeled 40, which is supplied by a conveyor belt 39, impacts upon the plate, the impact force of the produce 40 causes pivoting of the baffle plate 36 about the pivot axis 37; a movement pick-up 42, connected to a pivot axle by a lever 41, then travels a greater or lesser distance according to the deflection of the lever 41, and this distance of travel is converted into an electrical signal as a measured value for the input quantity.

The control of an intermittently operating, cup-type peeling machine, which is not illustrated, may also be optimised in the desired manner, when the aforementioned measuring, viewing and indicator devices are incorporated, by a volume or weight evaluation of the peel waste or an optical assessment of the produce peeled. In order to arrive at more favourable results, the produce input quantity (input rate), for example, of the produce to be peeled into the machine may be modified, i.e., for example, by changing from an input quantity batch by batch of 25 kg to 21 kg, to achieve the least possible amount of waste for the relevant type of potatoes or other produce to be peeled. For other produce, or for the next layer or batch, a different input quantity may be found to be more favourable. But also, by changing the speed of the peeling plate or plates with the peeling tools and/or the duration of the peeling time, the peeling operation may be changed to give the desired result and thereafter be maintained. In this connection it is preferred that a constant water supply rate be ensured, thus providing a fixed operating parameter.

I claim:

1. In a method of controlling a peeling machine for peeling fruit or vegetables supplied thereto, said machine comprising rotary peeling means for the fruit or vegetables including movable peeling rollers having roughened surfaces for peeling the fruit or vehetables, a motor driving said peeling means and means for supplying water to said peeling means, the improvement comprising the steps of checking at least one of peel waste discharged from said peeling means and the appearance of the peeled fruit or vegetables discharged from said peeling means and adjusting the operation of said machine in dependence upon the magnitude of the at least one of the peeled waste and said appearance, and further comprising the steps of determining the magnitude of one of the amount of said fruit or vegetables instantaneously suppled to said peeling means and the average amount of said fruit or vegetables supplied to said peeling means during a specific unit of time, signalling said magnitude to a computer, determining the quantity of water supplied to said peeling means, determining the quantity of water and waste peelings discharged from said peeling means, relating said magnitude and said quantitites to one another for establishing a difference therebetween, said difference indicating at least one of the amount of waste peelings instantaneously and the average of said waste peelings over said specific unit of time, using said difference as a starting variable and calculating from said starting variable the ratio of said difference to at least one of said magnitude of said instantaneous and said average amount to determine the ratio of waste peelings to said magnitude, displaying said ratio on a visual display in the computer and adjusting said machine to bring said ratio to a predetermined value and maintaining said ratio at said predetermined value.

2. A method as claimed in claim 1, in which said operation is adjusted as a function of said displayed ratio to achieve a minimum ratio of said waste peelings by adjusting at least one of the speed of the peeling rollers and of a conveying roller for the fruit or vegetables and the quantity of the fruit or vegetables supplied to said machine.

3. A method as claimed in claim 1, in which said adjustment of said operation includes one of adjustment of the speed of rotation of said rotary peeling means and the duration of time in which said fruit or vegetables are acted upon by said peeling means.

4. A method as claimed in clalim 1, in which said ratio is calculated from the difference in weight between the fruit or vegetables supplied to said peeling means and the weight of peeled fruit or vegetables discharged from said peeling means.

5. In an apparatus for peeling fruit or vegetables, said apparatus comprising rotatable peeling means for peeling the fruit or vegetables including peeling rollers having roughened surfaces, a motor driving said peeling means, an inlet means for said fruit or vegetables to said peeling means, an outlet means for peeled fruit or vegetables from said peeling means, means for supplying water to said peeling means, and means for discharging said water with waste peelings therein from said peeling means, the improvement comprising first means for measuring the quantity of at least one of said fruit or vegetables and said water supplied to said peeling means, second means for measuring at least one of said water containing said waste peelings and said fruit or vegetables discharged from said peeling means and means for assessing the peeling of said fruit or vegetables discharged from said peeling means in dependence upon values indicated by said measuring means, and means for connecting said peeling means and said first and second measuring means and said assessing means and computer means and means operatively connecting said computer means to said peeling machine to provide automatic control thereof.

6. Apparatus as claimed in claim 5, wherein said means for measuring the quantity of said fruit or vegetables supplied to said peeling means includes a baffle plate, means pivotally mounting said baffle plate, means for supplying said fruit or vegetables to said peeling means, means for moving said fruit or vegetables supplied to the said peeling means into contact with the said baffle plate and means for measuring the deflection of said baffle plate under the impact of said fruit or vegetables.

7. In an apparatus for controlling a peeling machine for peeling fruit or vegetables, said machine comprising rotatable peeling means for peeling the fruit or vegetables including peeling rollers having roughened surfaces, a motor driving said peeling means, an inlet means for said fruit or vegetables to said peeling means, an outlet means for peeled fruit or vegetables from said peeling means, means for supplying water to said peeling means, and means for discharging said water with waste peelings therein from said peeling means, the improvement comprising indicator means for indicating the content of said waste peelings in said discharged water, and means for connecting said indicator means and said peeling means, computer means and means operatively connecting said computer means to said peeling machine to provide automatic control thereof.

8. Apparatus as claimed in claim 7, wherein said indicator means includes ultrasonic means.

9. In an apparatus for peeling fruit or vegetables, said apparatus comprising rotatable peeling means for peeling the fruit or vegetables including peeling rollers having roughened surfaces, a motor driving said peeling means, an inlet means for said fruit or vegetables to said peeling means, an outlet means for peeled fruit or vegetables from said peeling means, means for supplying water to said peeling means, and means for discharging said water with waste peelings therein from said peeling means, the improvement comprising automatic viewing means for viewing said peeled fruit or vegetables in said outlet means from said peeling means, said viewing means including means for producing a signal dependent on a function of the appearance of said peeled fruit or vegetables, computer means and means for feeding said signal to said computer means, and said signal-producing means and said computer means being connected to said peeling means.

10. Apparatus as claimed in claimed 9, further comprising means operatively connecting said computer means to said peeling machine to provide automatic control thereof.

11. In a method of controlling a peeling machine for peeling fruit or vegetables, said machine comprising rotary peeling means for the fruit or vegetables, means for conveying the fruit or vegetables into the peeling machine, and means for supplying fresh water to the peeling means and for discharging waste water containing peelings from the peeling means, comprising the steps of determining the amount of fruit or vegetables conveyed into the peeling means, peeling the fruit or vegetables using the rotary peeling means, signaling the amount of fruit or vegetables instantaneously entering the peeling machine or an average amount of fruit or vegetables for a given time period entering the peeling machine to a computer, determining the amount of fresh water supplied to the peeling means and the amount of waste water including peelings discharged from the peeling means and signaling the respective amounts to the computer, checking the difference via the computer in the amount of fresh water and waste water including peelings and continuously determining and displaying on the computer the instantaneous peelings waste percentage compared to the corresponding fruit or vegetables conveyed to the peeling means, and controlling the peeling machine for bringing the wast percentage to the desired value and maintaining the desired value until the termination of the peeling step.

12. A method as claimed in claim 11, where in the step of controlling the peeling machine includes one of adjusting the speed of rotation of the rotary peeling means and the duration of time in which the fruit or vegetables are acted upon by the peeling means.

13. A method as claimed in claim 11, including the step of calculating the difference in weight between the fruit or vegetables conveyed to the peeling means and the weight of peeled fruit or vegetables exiting from the peeling means.

* * * * *